United States Patent Office 3,274,267
Patented Sept. 20, 1966

3,274,267
CYCLIC α-PERFLUORO-DI-p-XYLYLENES
Sui-Wu Chow, Somerville, N.J., assignor to Union Carbide Corporation, a corporation of New York
No Drawing. Filed Sept. 23, 1963, Ser. No. 310,860
13 Claims. (Cl. 260—649)

This invention relates to cyclic α-perfluoro-di-p-xylylenes and to a process for the preparation thereof.

The outstanding physical properties of the paraxylylene polymer family have prompted extensive efforts to enable their convenient preparation. Although these polymers have excellent thermal and chemical stability, the presence of —CH$_2$— groups adjacent to the aromatic ring provide potentially vulnerable sites for atmospheric attack. In order to strengthen these weak positions, it has been found desirable to replace the active hydrogen atoms with a more stable substituent group such as fluorine.

Heretofore, the only available method for producing α-perfluorinated-p-xylylene polymers was by the pyrolytic decomposition of an α,α'-bis-(alkyl sulfonyl)-α,α,α',α'-tetrafluoro-p-xylene. This method, however, results in the spontaneous evolution of sulfur dioxide which results in pressure fluctuations and the formation of various undesirable by-products which complicate the vacuum deposition of the polymer.

Accordingly, it is an object of the present invention to provide precursors of α-perfluoro-p-xylylene polymers which when pyrolyzed will not liberate sulfur dioxide or otherwise complicate the vacuum deposition process.

It is another object of this invention to provide cyclic α-perfluoro-di-p-xylylenes and a process for the preparation thereof.

Now in accordance with the present invention, cyclic α-perfluoro-di-p-xylylenes having the structural formula

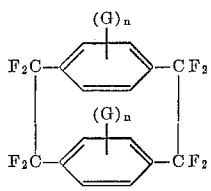

wherein G is an aromatic nuclear substituent group as hereinafter defined and n is an integer from 0 to 3, inclusive, can be produced by the process which comprises forming an α-perfluoro-p-xylylene diradical having the basic structure

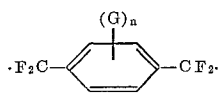

wherein G is as hereinafter defined and n is as described above by the pyrolysis at temperatures between about 600° C. and 900° C. of a bis-sulfone having the general formula

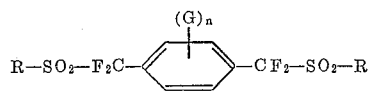

wherein G is as hereinafter defined and n is as described above and R is a lower hydrocarbon group, and cooling and condensing the thus formed diradicals in intimate mixture with a fluid medium containing an inert organic solvent maintained at a temperature above about 50° C.

In this process an α-perfluoro-p-xylylene diradical is produced by the pyrolytic cleavage of a p-xylylene bis-sulfone represented by the general formula

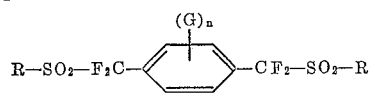

wherein G, n and R are as defined above.

R can be any lower hydrocarbon group since the group tends to be inert in the process and is not otherwise critical. For instance, it can be a lower alkyl group such as methyl, ethyl, n-propyl, isopropyl, n-butyl, isobutyl, t-butyl, hexyl and the like, a lower aryl group such as phenyl, alkylated phenyl and the like, alicyclic groups such as cyclohexane and other similar groups. Preferably, the lower hydrocarbon groups contemplated in the present invention are those containing up to about six carbon atoms in order to facilitate the removal of the by-products produced in the pyrolysis.

p-Xylene bis-sulfones can be conveniently prepared by reacting an alkyl or aryl mercaptan, in the presence of a base such as the alkali metal hydroxides or alkoxides such as sodium hydroxide, sodium methoxide, potassium butoxide, lithium hydroxide or the like, with a compound having the general formula

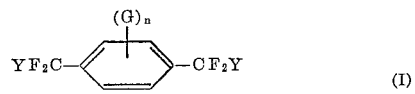

(I)

wherein G and n are as defined above and Y is a halogen having an atomic number greater than 9 such as chlorine, bromine or iodine, to form the corresponding dithioether. Compounds having the general Formula I can be formed by reacting α,α,α',α'-tetrafluoro-p-xylenes with a halogenating agent such as N-bromo-succinimide, chlorine, and the like. The dithioether is then oxidized to the corresponding bis-sulfone by oxidation with an oxidizing agent such as hydrogen peroxide, peracetic acid, or the like.

The pyrolytic cleaving of the bis-sulfone results in the formation of reactive diradicals having the basic structure

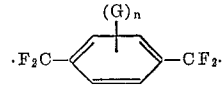

wherein G and n are as defined above as well as the formation of gaseous sulfur dioxide and other gaseous materials such as saturated and/or unsaturated hydrocarbons produced by coupling of the R radicals formed in the cleaving process.

Inasmuch as the coupling of these reactive diradicals does not involve the aromatic ring, unsubstituted or nuclear substituted cyclic α-perfluoro-di-p-xylylenes can be prepared provided the substituent groups function essentially as inert groups. Thus, the substituent group G can be inert organic or inorganic groups which can normally be substituted on aromatic nuclei. As an illustration of such substituent groups are the lower normal alkyls having from 1 to 3 carbon atoms such as methyl, ethyl and n-propyl, aryl, carbalkoxy, and like radicals as well as inorganic radicals such as the halogens, particularly fluorine, chlorine and bromine, and other similar groups which can be normally substituted on aromatic nuclei. Otherwise the positions on the aromatic ring are filled by hydrogen atoms.

In this process, the reactive diradicals are prepared by pyrolyzing a bis-sulfone at a temperature between about 600° C. to about 900° C. but below the cleavage temperature of any aromatic ring substituent present and preferably at a temperature between about 700° C. to about 850° C. At such temperatures, essentially quantitative yields of the reactive diradical are secured. Operation at temperatures less than about 600° C. serves only to increase the reaction time and lessen the yield of the cyclic dimer. At temperatures above about 900° C. some charring of the reactive diradical is occasioned which undesirably affects the resultant yield of product. Moreover, cleavage of the ring substituent can occur resulting in tri- or polyfunctional species.

Pyrolysis of the p-xylene-bis-sulfone is conveniently conducted by charging the bis-sulfone to the pyrolysis zone as a solution in such organic solvents as p-xylene, o-xylene, m-xylene, chlorobenzene, toluene, and the like. Although the pyrolysis can be conducted without the bis-sulfone being introduced in solution, this method is preferred.

Low partial pressures of the bis-sulfone are desirable in this process, preferably such that the bis-sulfone partial pressure is between about 0.1 and 20 mm. Hg, with optimum conditions generally being secured at a partial pressure of the bis-sulfone of about 1 to 10 mm. Hg.

While the presence of an inert vaporous diluent in the pyrolysis process is not critical, it is often desirable for use in this process in order to reduce the partial pressure of the p-xylene bis-sulfone and make it possible to operate at higher total pressures. Steam is a particularly desirable inert diluent in that gas flow through the condensation zone is minimized. Other inert diluents such as nitrogen, argon, and other similar inert gases can also be employed. Thus the total pressure of the system depends on the desired operating partial pressure of the p-xylene bis-sulfone, and the amount of steam and/or other diluents employed. When no diluents are employed, the pyrolysis reaction is preferably carried out at total pressures less than about 10 mm. Hg. Thus, in this process, it is possible to operate at total pressure even up to atmospheric pressure or higher.

The amount of steam present as a diluent and carrier gas is not narrowly critical but when employed, it is preferably present in an amount of at least about 50 moles per mole of p-xylene bis-sulfone and generally between about 100 to 200 moles per mole of α-perfluoro-p-xylene bis-sulfone although excess steam is not detrimental to the process.

Condensation of the α-perfluoro-p-xylylene diradicals into the cyclic α-perfluoro-di-p-xylylene is accomplished in the presence of an organic solvent. In order to remove the residual heat from the pyrolysate vapors without distilling or vaporizing the organic solvent, it is preferred that the reactive diradical be cooled to about 200° C.– 400° C., but at a temperature above the ceiling condensation-polymerization temperature of the reactive diradical. Cooling to below the ceiling condensation temperature in the absence of the organic solvent causes almost spontaneous polymerization of the reactive diradical into poly(α-perfluoro-p-xylylene). This ceiling condensation temperature is generally between 25° C. and 200° C. depending somewhat on the pressure. However, in the vaporous state, the reactive diradical is relatively stable and does not polymerize.

The cooling of the pyrolysate vapors can be accomplished in any of several convenient means. For instance, internal or extrenal condensers, cooling coils, tubes or the like can be employed immediately after the pyrolysis zone, or if desired natural cooling caused by long runs of air cooled tubing or piping from the pyrolysis zone to the condensing medium can be used. It is also possible to mix the organic solvent condensing medium in the vapor state with the pyrolysate vapors in a suitable manner or mixing chamber as another method.

It is essential in this process that the condensation of the cooled vaporous diradical be carried out in the presence of a fluid medium of an inert organic solvent. Illustrative of such organic solvents are those such as p-xylene, benzene, toluene, o-xylene, m-xylene, cumene, methylnaphthalene, o-dichlorobenzene, 1,2-di-p-tolylethane, mineral oil, diphenylmethane, 1,2-diphenylethane, heptane, decahydronaphthalene, and the like and preferably those having an atmospheric boiling point between about 50° C. and 250° C.

The α-perfluoro-di-p-xylylene product forms on the condensation of the vaporous diradicals in the presence of the fluid medium. It is not essential however that the fluid medium be in the liquid state during admixture with the diradicals. While this is most desirable, the condensation can be accomplished equally as well by mixing the pyrolysate vapors with the vaporous organic solvent and simultaneously condensing the total mixture to the liquid state for recovery.

When the cooled pyrolysate vapors of the reactive α-perfluoro-p-xylylene diradicals are collected in a liquid medium, merely bubbling or dispersing the vapor below the liquid level of the organic solvent is also adequate to cause the α-perfluoro-p-xylylene diradicals to dimerize to the α-perfluoro-di-p-xylylene. The resulting α-perfluoro-di-p-xylylene can thereafter be conveniently recovered from the solvent. The bath into which these vapors are condensed can be maintained at any temperature above 50° C. and preferably from 50° C. to 250° C.

Bath temperatures below 50° C. are considered undesirable and burdensome to maintain. The heat of condensation and cooling given off by the pyrolysate vapors conveniently maintains the organic solvent at temperatures above about 50° C. It has been found that conversion of the diradical to the polymer is increased at bath temperatures below 50° C. Therefore, to avoid competing reactions and decreased yield of the cyclic dimer, it is considered preferable to maintain the temperature of the bath between about 80° C. and 250° C. Thus, when employed herein, the term "fluid media" is intended to cover both the liquid or gaseous state of the solvent medium in which the pyrolysate vapors are collected.

Recovery of the cyclic α-perfluoro-di-p-xylylene is relatively simple. It can, for instance, readily be recovered by subliming it from high boiling solvents such as mineral oil. Preferably, however, a better method seems to be to remove a majority of a lower boiling solvent medium by distillation and then to crystallize the α-perfluoro-di-p-xylylene from the remaining solvent by cooling and filtering off the crystallized α-perfluoro-di-p-xylylene.

In a preferred method of operating this process, a dialkyl α,α,α',α'-tetrafluoro-p-xylyl-α,α'-bis-sulfone in chlorobenzene solution and steam are feed to an atmospheric pressure reactor or heated pyrolysis tube maintained at about 800° C. The hot pyrolysate vapors are cooled in a condenser at the outlet of the pyrolysis zone and cooled to a temperature of about 150°–250° C. and then passed into a bath of toluene which is maintained at 80°–90° C. by the hot pyrolysate where the condensation of the diradical to the dimer takes place.

Either continuously or in stages, the aqueous layer of the condensation medium containing dissolved sulfur dioxide is removed and the solution concentrated by flashing or reduced pressure distillation to about one-tenth its original volume. On cooling, the cyclic α-perfluoro-di-p-xylylene crystallizes from the toluene solution in high purity and is separated from the mother liquor by filtration or by centrifugation, washed and dried.

Poly(α-perfluoro-p-xylylenes) can be prepared by the pyrolytic cleavage of a cyclic α-perfluoro-di-p-xylylene of the present invention without the formation of sulfur dioxide or other by-products.

In the pyrolytic polymerization process, the reactive diradicals are prepared by pyrolyzing a cyclic α-perfluoro-di-p-xylylene at a temperature less than about 700° C. and preferably at a temperature between about 550° C. to about 650° C. At such temperatures, essentially quantitative yields of the reactive diradicals are secured. Pyrolysis of the cyclic dimer, α-perfluoro-di-p-xylylene begins at about 450° C. regardless of the pressure employed. Operation in the range of 450°–550° C. serves only to increase the reaction time. At temperatures above 700° C. cleavage of the substituent group/s can occur, resulting in a tri-/or polyfunctional species causing cross-linking or highly branched polymers.

Pyrolysis temperature is essentially independent of the operating pressure. It is however preferred that reduced or subatmospheric pressures be employed. For most operations, pressures within the range of 0.0001 to 10 mm. Hg absolute are most practical. However, if desired, greater pressures can be employed. Likewise if desirable, inert vaporous diluents such as nitrogen, argon, carbon dioxide, steam and the like can be employed to vary the optimum temperature of the pyrolysis or to change the total effective pressure in the system.

In the polymerization process, the diradicals condense and polymerize nearly instantaneously at the condensation temperature of the diradicals. The coupling of these diradicals involves such low activation energy and the chain propagation shows little or no preference as to the particular diradical, that steric and electronic effects are not important as they are in vinyl polymerization. Thus, substituted and/or unsubstituted α-perfluoro-p-xylylene polymers can be made by cooling the diradicals down to any temperature below the condensation temperature of the diradical.

Inasmuch as the temperatures involved in the pyrolytic polymerization process are comparatively low, any unsubstituted or nuclear substituted α-perfluoro-p-xylylene polymer can be prepared from the corresponding cyclic dimer. Thus, the substituent groups "G" can be any organic or inorganic group which can normally be substituted on aromatic nuclei. As an illustration of such substituent groups are alkyl, aryl, alkenyl, carboxyl, alkoxy, carbalkoxy, and the like radicals as well as inorganic radicals such as nitro, halogen and other similar groups which are normally substitutable on aromatic nuclei. Otherwise the positions on the aromatic ring are filled by hydrogen atoms.

Particularly, preferred of the substituent groups herein referred to as "G" are these simple hydrocarbon groups such as the lower alkyls as methyl, propyl, butyl, hexyl, lower aryl hydrocarbons such as phenyl, alkylated phenyl, naphthyl and like groups having no more than about 10 carbon atoms, and the halogen groups particularly chlorine, bromine, iodine, and fluorine.

Substituted α-perfluoro-di-p-xylylenes from which these reactive diradicals are prepared, can be prepared from the cyclic dimer, α-perfluoro-di-p-xylylene in most instances, by appropriate treatment, such as halogenation, acetylation, alkylation, and/or oxidation and reduction and like methods of introduction of such substituent groups into aromatic nuclei. Hereinafter the term "a cyclic α-perfluoro-di-p-xylylene" refers to both substituted or unsubstituted cyclic α-perfluoro-di-p-xylylene as hereinabove discussed, i.e., including those substituents initially present on the bis-sulfone as well as those which can be subsequently introduced by appropriate treatment of the unsubstituted cyclic dimer.

It has been observed that for each diradical species, there is a ceiling condensation temperature above which the diradical will not condense and polymerize efficiently. All observed ceilings of α- and ring substituted p-xylylene diradicals have been below 200° C. but vary to some degree upon the operating pressure involved. For example, at 0.5 mm. Hg pressure, the following condensation and polymerization ceilings are observed for the following diradicals:

|  | ° C. |
|---|---|
| p-Xylylene | 25–30 |
| α-Perfluoro-p-xylylene | 30–40 |
| 2-chloro-p-xylylene | 70–80 |
| 2-cyano-p-xylylene | 120–130 |
| 2-n-butyl-p-xylylene | 130–140 |
| 2-iodo-p-xylylene | 180–200 |

Thus, by this process, homopolymers are made by maintaining the substrate surface at a temperature below the ceiling condensation temperature of the particular diradical specie involved, or desired in the homopolymer. This is most appropriately termed "homopolymerizing conditions."

Where several different diradicals existing in the pyrolyzed mixture have different vapor pressure and condensation characteristics, as for example, unsubstituted α-perfluoro-p-xylylene and ring substituted α-perfluoro-p-xylylene species or any other mixture with other substituted diradicals, homopolymerization will result when the condensation and polymerization temperature is selected to be at or below that temperature where only one of the diradicals condense and polymerize. Thus, for purposes within this application, the term "under homopolymerization conditions" is intended to include those conditions where only homopolymers are formed. Therefore it is possible to make homopolymers from a mixture containing one or more of the substituted diradicals when any other diradicals present have different condensation or vapor pressure characteristics, and wherein only one diradical specie is condensed and polymerized on the substrate surface. Of course, other diradical species not condensed on the substrate surface can be drawn through the system, in vaporous form to be condensed and polymerized in a subsequent cold trap.

It is also possible to obtain α-perfluoro-p-xylylene copolymers through the pyrolysis process hereinabove described. Copolymers of α-perfluoro-p-xylylene and ring substituted α-perfluoro-p-xylylene diradicals, as well as copolymers of substituted α-perfluoro-p-xylylene diradicals wherein the substituted groups are all the same radicals but each diradical containing a differing number of substituent groups can all be obtained through said pyrolysis process. Moreover, it is also possible to obtain copolymers of α-perfluoro-p-xylylene and other p-xylylene species having no α-substitution such as p-xylylene and those ring-substituted species whose condensation temperatures are listed above. Copolymerization is also possible with different α-perhalogenated species.

Copolymerization occurs simultaneously with condensation upon cooling of the vaporous mixture of reactive diradicals to a temperature below about 200° C. under polymerization conditions. Copolymers can be made by maintaining the substrate surface at a temperature below the ceiling condensation temperature of the lowest boiling diradical desired in the copolymers, such as at room temperature or below. This is considered "copolymerizing conditions," since at least two of the diradicals will condense and copolymerize in a random copolymer at such temperature.

The polymers can be readily recovered from the polymerization zone by any convenient means, depending on the particular zone employed. Where a cold surface such as a condenser is employed as the polymerization zone, the polymer can be removed from the wall of the zone by mechanical stripping or other suitable means. Condensation of the diradical in a water sprayer or under the surface of an aqueous medium recovers the polymer in particulate form, which can then be separated by filtration and drying by conventional means prior to fabrication.

EXAMPLE I

*Preparation of α,α'-dibromo-α,α,α',α'-tetrafluoro-p-xylene*

α,α,α',α'-Tetrafluoro-p-xylene was prepared by the method of Hasek et al., J. Am. Chem. Soc. 82, 543 (1960), by the reaction of terephthaldehyde with sulfur tetrafluoride at temperatures of about 150° C.

0.15 mole of α,α,α',α'-tetrafluoro-p-xylene as prepared above was admixed with 0.33 mole of N-bromosuccinimide and 320 parts of carbon tetrachloride. The mixture was irradiated with an ultraviolet lamp while maintained at the reflux temperature of the solvent. The precipitated succinimide was removed by filtration and the filtrate was distilled to give 0.12 mole of the composition, α,α'-dibromo-α,α,α',α'-tetrafluoro-p-xylene having the structural formula

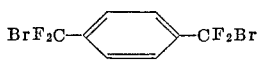

and a boiling point of 102°–107° C. at 25 mm. Hg.

The compound was subjected to infrared analysis which showed the characteristic —$CF_2$— absorptions at 9.2 and 9.4 microns. The presence of the bromine substituents was confirmed by hydrolysis of the compound to terephthalic acid with silver acetate in aqueous acetic acid solution.

The compound was subjected to elemental analysis as follows:

Calculated for $C_8H_4F_4Br_2$: C, 28.60; H, 1.20; F, 22.62; Br, 47.58. Found: C, 28.85; H, 1.34; F, 22.87; Br, 47.85.

EXAMPLE II

*Preparation of α,α'-bis(ethyl mercapto)-α,α,α',α' tetrafluoro-p-xylene*

To a solution of 0.11 mole of sodium in 40 ml. of methanol was added 0.1 mole of ethyl mercaptan and was then diluted with 100 ml. of dimethyl sulfoxide. After the addition of 0.045 mole of the α,α'-dibromo-α,α,α',α'-tetrafluoro-p-xylene produced in Example I, the reaction mixture was heated at 50° to 60° C. for about 2 hours. Thereafter, the reaction mixture was poured into water wherein the immiscible novel product α,α'-bis(ethyl mercapto)-α,α,α',α'-tetrafluoro-p-xylene having the structural formula

was separated.

The specific α,α'-bis(hydrocarbyl mercapto)-α,α,α',α'-tetrafluoro-p-xylene compositions summarized in Table I presented hereinbelow and having the general formula:

wherein R is a lower hydrocarbon group as defined above, were produced in the manner described above and are solely dependent upon the particular mercaptan employed in the reaction.

TABLE I.—α,α'-BIS(HYDROCARBYL MERCAPTO)-α,α,α',α'-TETRAFLUORO-p-XYLENE

| R-hydrocarbyl group | B.P. | Yield, percent |
|---|---|---|
| $C_2H_5$ | 90–110° (0.2 mm.) | 75 |
| n-$C_3H_7$ | 123–140° (0.5–1 mm.) | 76 |
| n-$C_4H_9$ | 130–140° (0.2 mm.) | 75 |
| —$C_6H_5$ | M.P. 152–160° | 40 |

EXAMPLE III

*Preparation of α,α'-bis(ethyl sulfonyl)-α,α,α',α'-tetrafluoro-p-xylene*

To a solution of 0.08 mole of α,α'-bis(ethyl mercato)-α,α,α',α'-tetrafluoro-p-xylene as prepared in Example II in 300 ml. of a 1:1 acetic acid/acetic anhydride mixture cooled to 0° to 5° C. was added 57 ml. of 30 percent hydrogen peroxide over a period of about two hours. The mixture was gradually allowed to warm to room temperature and was continuously stirred for 24 hours. The reaction mixture was poured into water wherein the immiscible product separated. The compound had a melting point of 158–164° C. The compound was subjected to an elemental analysis which showed:

Calculated for $C_{12}H_{14}F_4S_2O_4$: C, 39.77; H, 3.89; F, 20.97; S, 17.70; O, 17.67. Found C, 3973, H, 3.91; F, 20.74; S, 17.50; O, 18.12.

Table II summarizes the α,α'-bis(hydrocarbyl sulfonyl)-α,α,α',α'-tetrafluoro-p-xylylenes having the general formula

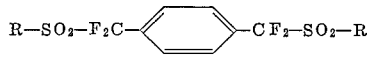

wherein R is a lower hydrocarbon group as described above, which was produced in the manner described above.

TABLE II.—α,α'-(HYDROCARBYL SULFONYL)-α,α,α',α'-TETRAFLUORO-p-XYLENES

| R-hydrocarbyl group | M.P., degrees | Yield, percent |
|---|---|---|
| $C_2H_5$ | 158–164 | 83 |
| n-$C_3H_7$ | 158–163 | 65 |
| n-$C_4H_9$ | 162–166 | 63 |
| $C_6H_5$ | 232–240 | 59 |

EXAMPLE IV

*Preparation of ring substituted α,α'-bis(ethyl mercapto)-α,α,α',α'-tetrafluoro-p-xylene*

A solution of sodium methoxide was prepared from 2.05 grams of sodium and 40 milliliters of methanol and was thereafter diluted with 100 milliliters of dimethyl sulfoxide. 5.5 grams of ethyl mercaptan was added and the solution was stirred for 10 minutes. To the above stirred solution of the ethyl mercaptide was then added 13.9 grams of 2-chloro-α,α'-dibromo-α,α,α',α'-tetrafluoro-p-xylene. The reaction mixture was heated at 50°–60° C. for 2 hours and then cooled and stirred at room temperature for 16 hours. The mixture was poured into ice water and extracted with methylene chloride. Distillation of the extracted residue gave 11.4 grams of 2-chloro-α,α'-bis-(ethyl mercapto)α,α,α',α'-tetrafluoro-p-xylene representing a 91% yield. The product had a boiling point of 105°–120° C. at 0.2–0.5 mm. Hg.

EXAMPLE V

*Preparation of ring substituted-α,α'-bis-(ethylsulfonyl)-α,α,α',α'-tetrafluoro-p-xylene*

To a solution of 11.4 grams of 2-chloro-α,α'-bis(ethyl mercapto)α,α,α',α'-tetrafluoro-p-xylene as produced in Example IV in 130 milliliters of 1:1 acetic acid-acetic anhydride solution was added dropwise 25 milliliters of 30 percent hydrogen peroxide at 0° to 5° C. Stirring was continued at this temperature for 3 hours, then the mixture was allowed to gradually warm up to room temperature. Upon pouring into ice water, the sulfone separated and was thereafter washed successively with water, 50% sodium carbonate and again with water. Recrystallization from chloroform/hexane solution gave 7.2 grams of 2-chloro-α,α'-bis(ethyl sulfonyl)α,α,α',α'-tetrafluoro-p-xylene having a melting point of 120–122° C. The infrared spectrum (KCl pellet) showed $SO_2$ absorption at 7.5 and 8.6μ and fluorine absorptions between 9 and 10 microns.

The compound having the structural formula

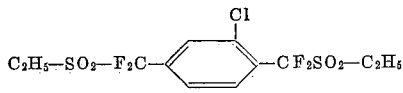

was subjected to an elemental analysis which showed:

Calculated for $C_{12}H_{13}F_4S_2O_4$: C, 36.24; H, 3.30; F, 19.20; S, 16.16; Cl, 8.94. Found: C, 36.48; H, 3.25; F, 19.36; S, 16.28; Cl, 8.82.

EXAMPLE VI 2-phenyl-p-xylene prepared as described by J. Colonge et al., Compt. Rend. 251, 2723 (1960), is converted to 2-phenylterephthalaldehyde by irradiating 121.94 grams of 2-phenyl-p-xylene with an ultraviolet lamp while heating said p-xylene to 110°–130° C. 464 grams of bromine are added to the irradiated p-xylene to form α,α,α',α'-tetrabromo-2-phenyl-p-xylene which is taken up in 500 ml. of methylene chloride, washed with 5% thiosulfate solution to remove excess bromine and subsequently washed with water. The crude α-tetrabrominated compound is dried and the methylene chloride is evaporated.

The crude α-tetrabrominated p-xylene is then added to 650 ml. of concentrated sulfuric acid and the mixture is stirred and heated to 110° C. The reaction mixture is maintained at 110° C. for three hours under aspirator pressure. Thereafter, the mixture is poured into an ice bath. The product is collected by filtration and washed successively with water and 5% sodium carbonate solution. Thereafter, the product 2-phenyl-terephthalaldehyde, is recrystallized from chloroform and hexane.

In a manner analogous to that described in Examples I–III, the 2-phenyl terephthalaldehyde is converted to the corresponding α,α'-bis(hydrocarbyl sulfonyl)-α,α,α',α'-tetrafluoro-2-phenyl-p-xylene having the general formula:

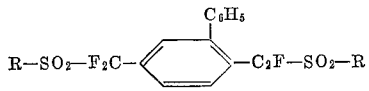

EXAMPLE VII

*Preparation of cyclic α-perfluoro-di-p-xylylene*

5.0 grams of α,α'-bis(ethyl sulfonyl)-α,α,α',α'-p-xylene in 75 milliliters of toluene was added dropwise over 2 hours through a quartz pyrolysis tube heated at 750° C. by means of a high temperature electric furnace. Steam generated from distilled water was admixed with the solution before entering the pyrolysis zone. The hot pyrolysate leaving the pyrolysis zone was passed into a bath of toluene maintained at 85±5° C. Evaporation of the toluene solution gave 0.36 grams of residue. The residue was dissolved in a chloroform-hexane solution and the cyclic dimer, α-perfluoro-di-p-xylylene was recrystallized therefrom and subjected to sublimation to give 0.22 gram of the pure cyclic dimer having a melting point of 263–7° C.

A sample of the dimer was subjected to elemental analysis which gave the following units:

Calculated for $C_{16}H_8F_8$: C, 54.55; H, 2.29; F, 43.15; molecular weight, 352. Found: C, 54.63; H, 2.33; F, 43.36; molecular weight, 317.

EXAMPLE VIII

The following Table III summarizes other examples illustrating the preparation of substituted and unsubstituted cyclic α-perfluoro-di-p-xylylenes by the pyrolysis of the corresponding bis-sulfones as described in Example VII.

TABLE III.—PREPARATION OF α-PERFLUORO-DI-p-XYLYLENES

| R-SO₂-F₂C-⟨(G)ₙ⟩-CF₂-SO₂-R | | | Solvent | Pyrolysis Temp., °C. |
|---|---|---|---|---|
| R | G | n | | |
| $C_2H_5$ | | 0 | m-Xylene | 750 |
| $C_2H_5$ | | 0 | Chlorobenzene | 800 |
| $C_3H_7$ | | 0 | Chlorobenzene | 700 |
| $C_2H_5$ | Cl— | 1 | Toluene | 750 |
| $C_2H_5$ | $C_6H_5$— | 1 | Toluene | 750 |

EXAMPLE IX

*Preparation of poly(perfluoro-p-xylylene)*

α-Perfluoro-di-p-xylylene, or cyclo di(α,α,α',α'-tetrafluoro-p-xylene) as it can also be called, as prepared in Example VII was charged to a quartz pyrolysis tube in the gaseous state by means of sublimation at 150° C. under reduced pressure. The quartz pyrolysis tube was maintained at 650° C. by a high temperature furnace surrounding said tube. The pyrolysis tube leads into a water cooled condenser and the entire system was maintained under a reduced pressure of 0.01 millimeters Hg. The hot pyrolysate formed during the pyrolysis was condensed on the walls of the water-cooled condenser to form a polymeric film of poly(α-perfluoro-p-xylylene) which could be stripped from the glass surface. Comparison of the infrared spectrum of the film with that of a standard obtained by the pyrolysis of an α,α'-bis(alkylsulfonyl)-α,α,α',α'-tetrafluoro-p-xylene showed that they were identical.

These polymers have been found to exhibit excellent solvent resistance and thermal stability. These polymers are particularly desirable in films, surface coatings, electrical insulation and other similar applications, particularly where high resistance to thermal and chemical deterioration is necessary.

For example, copper wires upon which poly(α-perfluoro-p-xylylene) has been vapor deposited provided excellent electrical conductors having an integral insulating coating thereon which is highly resistant to environmental deterioration. Moreover, when fibrous materials such as paper or cloth are impregnated with the vapor deposited polymer, the wet strength of the material is increased; also, the impregnated materials can now be employed in atmospheres wherein thermal and chemical deterioration would have made their prior use almost impossible.

I claim:

1. Process for the preparation of cyclic α-perfluoro-di-p-xylylenes having the structure:

$$F_2C-\langle\rangle-CF_2$$
$$|\qquad\qquad|$$
$$F_2C-\langle\rangle-CF_2$$
$$(G)_n$$

wherein G is an aromatic nuclear substituent selected from the group consisting of hydrocarbon and halo and n is a number from 0 to 3, inclusive, which comprises pyrolyzing a bis-sulfone having the general formula $$R-SO_2-F_2C-\langle(G)_n\rangle-CF_2-SO_2-R$$

wherein G and n are as defined above and R is a hydrocarbyl group containing up to about six carbon atoms, inclusive, at temperatures between about 600° C. and 900° C. and at partial pressures of said bis-sulfone less than about 20 mm. Hg, cooling and bringing the resulting pyrolyzed vapors in intimate mixture with an inert organic solvent maintained at a temperature of from about 50° C. to about 250° C. and recovering said cyclic α-perfluoro-di-p-xylylene from said solvent.

2. Process as defined in claim 1 wherein the pyrolysis temperature is between about 700° and about 850° C.

3. Process as defined in claim 1 wherein the bis-sulfone is introduced to the pyrolysis zone in admixture with an organic solvent solution.

4. Process as defined in claim 1 wherein an inert vaporous diluent is employed.

5. Process as defined in claim 4 wherein the inert vaporous diluent is steam.

6. Process as defined in claim 1 wherein the inert organic solvent is introduced as a vapor and the total mixture is simultaneously condensed to the liquid state for recovery.

7. Process for the preparation of cyclic α-perfluoro-di-p-xylylenes having the structure:

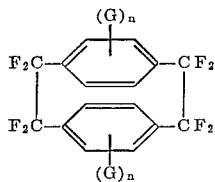

wherein G is an aromatic nuclear substituent selected from the group consisting of hydrocarbon and halo and $n$ is a number from 0 to 3, inclusive, which comprises pyrolyzing a solution of a bis-sulfone having the general formula

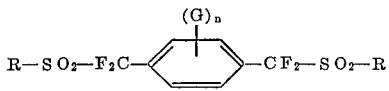

wherein G and $n$ are as defined above and R is a hydrocarbyl group containing up to about six carbon atoms, inclusive, in an organic solvent, said solution being in admixture with an inert vaporous diluent, at temperatures between about 600° C. and 900° C. and at partial pressures of said bis-sulfone less than about 20 mm. Hg, cooling and bringing the resulting pyrolyzed vapors in intimate mixture with an inert organic solvent maintained at a temperature of from about 50° C. to about 250° C. and recovering said cyclic α-perfluoro di-p-xylylene from said solvent.

8. Process as defined in claim 7 wherein the pyrolysis temperature is between about 700° C. and about 850° C.

9. Process as defined in claim 7 wherein the inert vaporous diluent is steam.

10. Process as defined in claim 7 wherein the fluid condensing medium contains an inert organic solvent maintained at a temperature of about 80°–90° C.

11. Process as defined in claim 7 wherein the inert organic solvent is introduced as a vapor and the total mixture is simultaneously condensed to the liquid state for recovery.

12. Cyclic α-perfluoro-di-p-xylylene having the structure

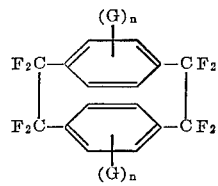

wherein G is an aromatic nuclear substituent selected from the group consisting of hydrocarbon and halo and $n$ is a number from 0 to 3, inclusive.

13. Cyclic α-perfluoro-di-p-xylylene.

References Cited by the Examiner

UNITED STATES PATENTS 3,185,743   5/1965   La Combe et al. _____ 260—649

FOREIGN PATENTS 1,085,673   7/1960   Germany.

OTHER REFERENCES

Pellegrin, "Trav. Chem. Pays-Bas," 18, pp. 457–65 (1899).

LEON ZITVER, *Primary Examiner.*

K. H. JOHNSON, K. V. ROCKEY, *Assistant Examiners.*